United States Patent
Yamaguchi et al.

[11] Patent Number: 5,918,795
[45] Date of Patent: Jul. 6, 1999

[54] SOLDERING ALLOY, CREAM SOLDER AND SOLDERING METHOD

[75] Inventors: Atsushi Yamaguchi, Moriguchi; Tetsuo Fukushima, Katano, both of Japan

[73] Assignee: Matshushita Electric Industrial Co., Ltd., Japan

[21] Appl. No.: 08/792,128

[22] Filed: Jan. 31, 1997

[30] Foreign Application Priority Data

Feb. 9, 1996 [JP] Japan ................................ 8-023547

[51] Int. Cl.$^6$ ............................. B23K 35/26; B23K 1/00
[52] U.S. Cl. ......................... 228/200; 420/561; 420/562
[58] Field of Search ............................ 420/561, 562; 228/200

[56] References Cited

U.S. PATENT DOCUMENTS 16,784   3/1857   Blandy ................................... 420/562
5,328,660 7/1994 Gonya et al. ........................... 420/562
5,429,689 7/1995 Shangguan et al. ..................... 420/562
5,520,752 5/1996 Lucey, Jr. et al. ...................... 420/561
5,730,932 3/1998 Sarkhel et al. .......................... 420/562

*Primary Examiner*—Patrick Ryan
*Assistant Examiner*—Jeffrey T. Knapp
*Attorney, Agent, or Firm*—Parkhurst & Wendel

[57] ABSTRACT

The present invention relates to a soldering alloy composed mainly of Sn and free from lead which is a toxic substance. An addition of a small quantity of Ag to the soldering alloy can fine the alloy structure, minimize structural changes of the alloy and increase thermal fatigue resistance thereof. An addition of a small quantity of Bi to the soldering alloy lowers the melting point and improves the wettability thereof. Further, an addition of a small quantity of Cu restrains the growth of intermetallic compounds in the bonding interface between a copper land and the solder. Furthermore, an addition of a small quantity of In improves the elongation property and thermal fatigue resistance of the alloy.

4 Claims, 1 Drawing Sheet

SOLDERING ALLOY, CREAM SOLDER AND SOLDERING METHOD

FIELD OF THE INVENTION

The present invention relates to a soldering alloy and a cream solder for soldering electronic circuit boards and a process of soldering the same.

BACKGROUND OF THE INVENTION

Size reduction and high-density mounting of electronic components are a fast growing trend in the recent electronic parts assembly technology. With this trend, a demand is increasing for higher reliability and performance of soldering materials in correspondence to narrow-pitched electronic parts. Meanwhile, the concern for environmental protection is increasing and there is a movement to legally regulate disposal of industrial wastes including electronic circuit boards.

Hereinafter, a conventional soldering material will be described with reference to drawings. FIG. 2 shows an alloy composition of a conventional soldering material and its metallic structure in a bonding interface between a copper land and a solder. In FIG. 2, reference numeral 1 indicates an α-solid-solution Sn layer. 2 indicates a β-solid-solution Pb layer. 3 indicates an intermetallic compound composed of $Cu_3Sn$. 4 also indicates an intermetallic compound composed of $Cu_6Sn_5$. Indicated by 5 is a Cu land.

The aforesaid conventional solder is an eutectic alloy composed of Sn and Pb, having an eutectic point of 183° C., in which Sn accounts for 63 weight % and Pb 37 weight %. The alloy contains the α solid solution 1 and the β solid solution 2 in lamellar states. Further, the intermetallic compounds 3 and 4 are formed in the bonding interface between the copper land and the solder.

From the environmental protection view point, however, such a movement as to restrict the use of lead which is a toxic substance in a Sn—Pb alloy solder is rapidly spreading all over the world. The conventional solder material in which the alloy has a lamellar structure poses a problem that the alloy components swell at a high temperature and the solder is stressed thereby, whereby the interfaces between the alloy components are caused to slide, resulting in soldering cracks. There is another problem that, during soldering or at high temperatures, a rigid and brittle two-layered intermetallic compound is produced in the bonding interface between the solder and the copper land, whereby cracks are caused to take place in the interface.

DISCLOSURE OF THE INVENTION

In view of the aforesaid problems, the present invention has an purpose to provide a soldering material free from lead, in which alloy components are fine structured and intermetallic compounds are restrained from growing in the bonding interface between a solder and a copper land, so that the changes of the components with passage of time at high temperatures can be minimized and an excellent thermal fatigue resistance at high temperatures can be obtained.

In order to achieve the aforesaid purpose, a soldering alloy according to a first invention of the present application contains Sn, Ag and Bi as main components, wherein the content of Sn is 83 to 92 weight %, that of Ag is 2.5 to 4.0 weight % and that of Bi is 5 to 18 weight %.

In order to achieve the aforesaid purpose, a soldering alloy according to a second invention of the present application contains Sn, Ag, Bi, Cu and In as main components, wherein the content of Sn is 80 to 92 weight %, that of Ag is 2.5 to 4.0 weight %, that of Bi is 5 to 18 weight %, that of Cu is 0.1 to 0.7 weight % and that of In is 0.1 to 1.5 weight %.

According to the first invention, the soldering alloy is composed mainly of Sn, and an addition of a small quantity of Ag thereto enables it to provide an alloy having a fine alloy structure and an excellent thermal fatigue resistance at high temperatures. Further, an addition of a small quantity of Bi thereto enables it to lower the melting point and improve the wettability.

According to the second invention, the soldering alloy composed of the same components as or the first invention is further added with a small quantity of Cu, whereby the growth of intermetallic compounds in the bonding interface between the copper land and the solder can be restrained. Further, an addition of a small quantity of In can improve the elongation property and thermal fatigue resistance of the alloy.

The reason the composition of the soldering alloy is so limited as mentioned above according to the first and second inventions will be explained below.

Ag is effective to improve the thermal fatigue resistance of the alloy. However, if the quantity of added Ag is less than 2.5 weight %, such effect cannot be sufficiently exerted. Meanwhile, in order to secure the melting point at and lower than 220° C., the content of Ag has to be 4.0 weight % or less. If the added quantity of Ag exceeds 4.0 weight %, the melting point rises rapidly unfavorably. For this reason, the quantity of addition of Ag should be preferably kept between 2.5 and 4.0 weight %.

Bi is effective to lower the melting point and to enhance the wettability. However, if the quantity of added Bi is less than 5 weight %, such effect cannot be sufficiently exerted. Meanwhile, if the quantity of added Bi exceeds 18 weight %, enough soldering strength cannot be obtained unfavorably. Therefore, the quantity of addition of Bi should be preferably between 5 and 18 weight %.

Cu is effective to improve the thermal properties of the alloy and to restrain the formation of intermetallic compounds in the bonding interface between the solder and the copper land. However, if the quantity of added Cu is less than 0.1 weight %, such effect cannot be exerted, and if the quantity exceeds 0.7 weight %, the alloy becomes rigid and brittle. Therefore, the quantity of addition of Cu is preferably between 0.1 and 0.7 weight %.

In is effective to improve the elongation property, wettability and thermal fatigue resistance of the alloy. However, if the quantity of added In is less than 0.1 weight %, such effect cannot be exerted, and if the quantity exceeds 1.5 weight %, the mechanical strength of the alloy is decreased. Therefore, the quantity of addition of In should be preferably between 0.1 to 1.5 weight %.

A cream solder according to a third invention of the present application is prepared by adding and mixing a flux into the alloy of the first or second invention, and has similar features to those of the solder of the first or second invention.

In order to achieve the aforesaid purpose, a soldering method according to a fourth invention of the present application is characterized in that the soldering alloy of the first or second invention is solidified by quenching at a solidification process of soldering, so that the intermetallic compounds can be dispersed finely and the mechanical strength increased.

An applicable quenching method here is preferably a cold air blowing, wherein the quenching rate is between 5 to 15° C./second, most preferably at or about 10° C./second.

According to the fourth invention, quench solidification of the soldering alloy allows the intermetallic compounds of $Ag_3Sn$, $Cu_3Sn$ and $CuSn_5$ to be restrained from growing and to be dispersed finely, whereby the mechanical strength and thermal fatigue resistance of the alloy can be improved.

DESCRIPTION OF PREFERRED EMBODIMENTS

An embodiment of the present invention will be detailed with reference to Examples 1 to 3 and Comparative Examples 1 and 2 as shown in Table 1.

Table 1 shows the composition (in weight %), melting point, wettability, bonding strength and thermal shock resistance of soldering alloys used in Examples 1 to 3 and Comparative Examples 1 and 2.

while used in Comparative Example 2 was a soldering alloy containing 63 weight % of Sn and 37 weight % of Pb.

EXAMPLE 1

The soldering alloy of Example 1 is composed of three components, that is; 90.5 weight % of Sn, 3.5 weight % of Ag and 6 weight % of Bi.

The soldering alloy was made into a cream solder by adding thereto the RMA type flux for use in the air. Then, the melting point, wettability, bonding strength and thermal shock resistance test were conducted on this cream solder. The results are given in Table 1. Also, a tensile strength test was conducted, and it was known that the solder of Example 1 has a tensile strength of 8.3 $kgf/mm^2$. When compared with Comparative Example 2 in which the tensile strength was 6.5 $kgf/mm^2$, it is known that the solder of Example 1 has a remarkably improved tensile strength.

Figure 1:
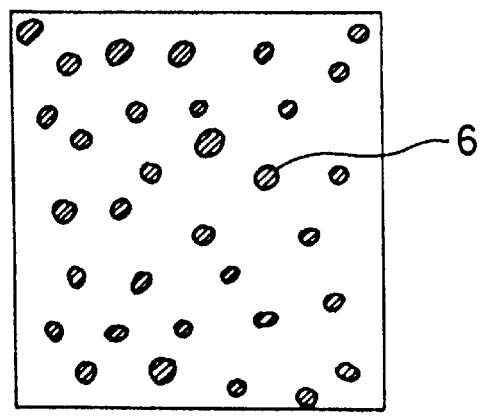
FIG. 1 shows the composition of a soldering alloy used in an embodiment of the present invention.
Figure 2:
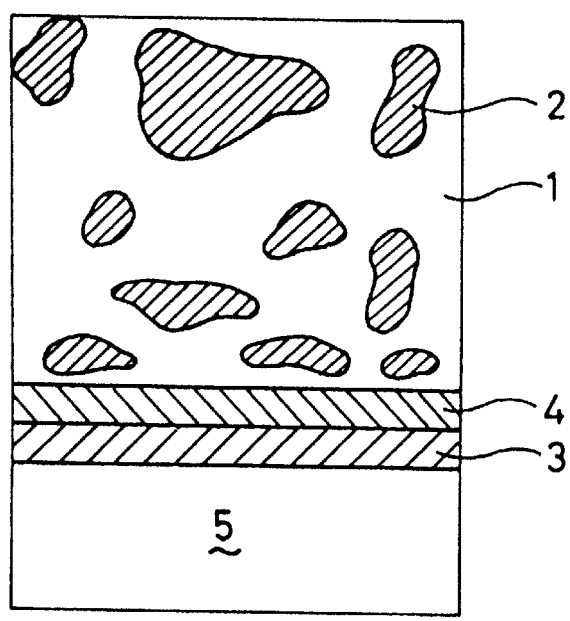
FIG. 2 shows the alloy structure of a conventional solder and its metallic composition in the bonding interface between a copper land and a solder.

Subsequently, the solder was quench solidified at the solidifying process of the soldering. As a result, as depicted in FIG. 1, intermetallic compounds ($Ag_3Sn$) 6 was restrained from growing and finely dispersed. Besides, it was possible to increase the mechanical strength and to improve the thermal fatigue resistance. Moreover, intermetallic com-

TABLE 1

| | | Components (weight %) | | | | | Melting point, (° C.) | Wetta-bility (%) | Bonding strength (kgf) | Thermal shock test |
| --- | --- | --- | --- | --- | --- | --- | --- | --- | --- | --- |
| | | Sn | Ag | Bi | Cu | In | Pb | | | |
| Example | 1 | Remainder | 3.5 | 6 | | | | 210–216 | 88.9 | 1.0 | OK |
| | 2 | Remainder | 3 | 10 | 0.5 | 1 | | 197–207 | 88.9 | 1.2 | OK |
| | 3 | Remainder | 3 | 15 | 0.5 | 1 | | 187–201 | 89.1 | 1.3 | OK |
| Comparative example | 1 | Remainder | 3.5 | | | | | 221 | 84 | 1.3 | OK |
| | 2 | Remainder | | | | | 37 | 183 | 89.8 | 1.0 | NG |

The melting points were measured for each soldering alloy by way of thermal analysis.

Each alloy was made into a cream solder of the RMA (Rosin Mild Activated) type for use in the air, and the wettability, bonding strength and thermal shock resistance tests were conducted on each cream solder.

In evaluating the wettability, an OFP with a 0.5 mm pitch was first mounted, and then the peeling strength per lead was measured.

The thermal shock resistance test was conducted using a thermal shock resistance tester under the following conditions: each cream solder specimen was subjected to temperature changes from 40° C. (30 minutes) through normal temperature (5 minutes) up to 80° C. (30 minutes) for 500 cycles. Thereafter, whether cracks exist or not was checked for evaluation of the thermal shock resistance.

In preparing a cream solder from the aforesaid soldering alloy, there was no particular restriction in selecting the type of flux to be added, and such fluxes as a flux for air reflow, a flux for $N_2$ reflow, a RA (Rosin Activated) type flux and a RMA (Rosin Mild Activated) type flux were proven to be usable. Among these, the most preferable was the RMA type flux for use in the air, which is active and has relatively high anti-corrosiveness.

Used in Comparative Example 1 was an soldering alloy containing 96.5 weight % of Sn and 3.5 weight % of Ag, pounds in the bonding interface between the copper land and the solder could be prevented from increasing. In the quench solidification of the solder, cold air blowing was applied at a cooling rate of about 10° C./second, thereby to cool the soldered joint.

EXAMPLE 2

Used in Example 2 is a soldering alloy composed of the following five components: 85.5 weight % of Sn, 3 weight % of Ag, 10 weight % of Bi, 0.5 weight % of Cu and 1 weight % of In.

The test results are summarized in Table 1. Example 2 shows improvement over Example 1 in that the melting point is lowered and the bonding strength increased.

The soldering alloy of Example 2 was also quench solidified when it was soldered. As a result, further improvement was observed with respect to the mechanical strength and the thermal fatigue resistance.

EXAMPLE 3

Used in Example 3 is a soldering alloy composed of the following five components: 80.5 weight % of Sn, 3 weight % of Ag, 15 weight % of Bi, 0.5 weight % of Cu and 1 weight % of In.

Compared with Example 2, the quantity of Bi contained in the alloy of Example 3 was increased. As a result, as shown in Table 1, a remarkable effect was observed in lowering the melting point.

The soldering alloy of Example 3 was also quench solidified when it was soldered. As a result, still further improvement was observed with respect to the mechanical strength and the thermal fatigue resistance.

As is known from the above, with an addition of a small quantity of Ag to the solder of the present invention which contains Sn as a main component, such a soldering alloy can be obtained as having a fine alloy structure, being subjected to minimized structural changes, and having an excellent thermal fatigue resistance.

Also, an addition of a small quantity of Bi can lower the melting point and improve the wettability.

Further, an addition of a small quantity of Cu makes it possible to restrain the growth of intermetallic compounds in the bonding interface between the copper land and the solder, thereby increasing the bonding strength.

Still further, an addition of a small quantity of In can improve the elongation property and increase the thermal fatigue resistance.

Another point to be noted is that by quench solidifying the solder at the cooling process of the soldering, the alloy structure can be fined and the intermetallic compounds can be refrained from growing in the bonding interface between the copper land and the solder. Obtained in this result is a soldering alloy which is excellent in both mechanical strength and thermal fatigue resistance.

Still another advantage is that the solder thus obtained is free from lead or a toxic substance.

What is claimed is:

1. A soldering method comprising:

providing a soldering alloy consisting essentially of Sn, Ag and Bi, wherein said alloy contains 83 to 92 weight % of Sn, 2.5 to 4.0 weight % of Ag, and 5 to 18 weight % of Bi, and quenching said soldering alloy to solidify same and finely disperse intermetallic compounds, thereby increasing the mechanical strength of said soldering alloy.

2. A soldering alloy consisting essentially of Sn, Ag, Bi, Cu and In, wherein said alloy contains 80 to 92 weight % of Sn, 2.5 to 4.0 weight % of Ag, 5 to 18 weight % of Bi, 0.1 to 0.7 weight % of Cu and 0.1 to 1.5 weight % of In.

3. A cream solder prepared by adding a flux to the soldering alloy as claimed in claim 2.

4. A soldering method using the soldering alloy as claimed in claim 2, wherein the soldering alloy is solidified by quenching to finely disperse intermetallic compounds, thereby increasing the mechanical strength of the soldering alloy.

* * * * *

UNITED STATES PATENT AND TRADEMARK OFFICE
CERTIFICATE OF CORRECTION

PATENT NO. : 5,918,795
DATED : July 6, 1999
INVENTOR(S) : Atsushi YAMAGUCHI et al.

It is certified that error appears in the above-indentified patent and that said Letters Patent is hereby corrected as shown below:

Title page, item, [73] Assignee:, change "Matshushita" to --Matsushita--.

Signed and Sealed this

Thirteenth Day of June, 2000

Attest:

Q. TODD DICKINSON

*Attesting Officer*     *Director of Patents and Trademarks*